W. P. ROBINSON
Thill-Coupling.

No 49,552 — Patented Aug. 22, 1865.

Witnesses:
Y. J. Levy
G. B. Nichols

Inventor:
Wm P. Robinson
by Coburn & Marrs
attorneys

UNITED STATES PATENT OFFICE.

WILLIAM P. ROBINSON, OF BRIMFIELD, ILLINOIS, ASSIGNOR TO HIMSELF AND N. E. WORTHINGTON.

IMPROVEMENT IN ADJUSTABLE THILLS.

Specification forming part of Letters Patent No. 49,552, dated August 22, 1865.

*To all whom it may concern:*

Be it known that I, WILLIAM P. ROBINSON, of Brimfield, in the county of Peoria and State of Illinois, have invented a new and useful Improvement in Adjustable Thills; and I do hereby declare that the following is a full, clear, and exact description of the same, reference being made to the accompanying drawings and the letters and figures marked thereon, which form part of this specification.

The nature of my said invention consists in a novel arrangement whereby the thills of a wagon or other vehicle drawn by a single horse may be readily adjusted, so as to enable the horse to travel in the center of the road or upon either side thereof, as may be desired, the wagon-wheels in all cases keeping in the same track with ordinary two-horse vehicles.

To enable those skilled in the art to understand how to construct and use my invention, I will proceed to describe the same with particularity, making reference in so doing to the aforesaid drawings, in which—

Figure 1:
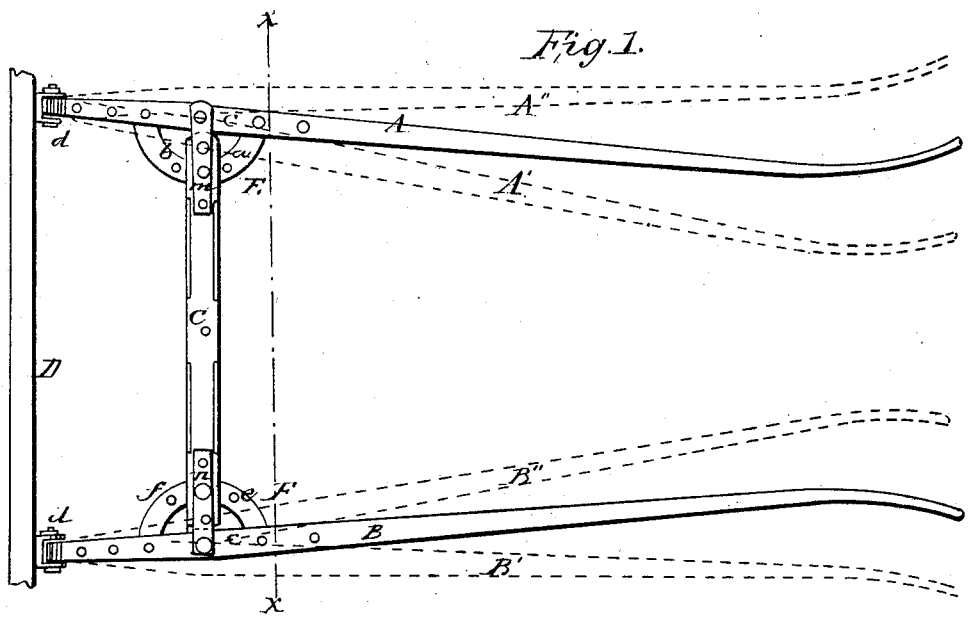
Figure 2:
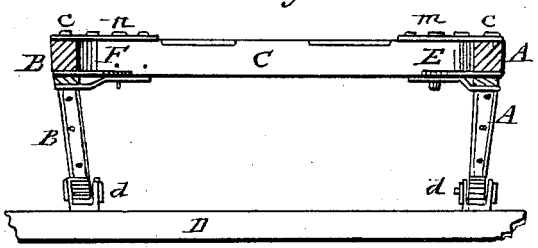

Figure 1 represents a plan or top view of my invention, and Fig. 2 an end view of the same in section at the line $x$ in Fig. 1.

Similar letters of reference in the different figures of the drawings indicate the same parts of my invention.

A B represent the thills, which are attached to the axle D in any suitable manner at $d$, provided such attachment allows a certain degree of lateral motion to the thills, as hereinafter described.

C represents a cross-bar connecting the thills, as shown, said bar being so attached to the thills by means of iron straps and the pivots $c$ $c$, as shown, at each end that the connection of said cross-bar with the thills is not rigid, but admits of a certain degree of motion about the points $c$ $c$.

Beneath the cross-bar, at each end thereof, and arranged in a slot between said cross-bar and the strap which connects it with the thills, are arranged the two semicircles E F, as shown, the said semicircles or arcs being rigidly attached to the thills. In each of said arcs E and F, respectively, there are three holes, one at the central point of said arcs, through which the pins or bolts $m$ and $n$ respectively pass when the parts are arranged as indicated by the full lines in the drawings, and upon each side of said middle perforations, which are indicated by $a$ $b$ $e$ $f$, respectively. When the thills are adjusted as shown in said full lines the horse travels in the middle of the road. When it is desired to have the horse travel in the right-hand path or upon the right-hand side of the road, the thills are adjusted as indicated by the dotted lines A' B', said adjustment being effected by withdrawing the pins $m$ and $n$ and moving the thills laterally until the holes in the cross-bar C lie directly over the holes $a$ and $f$, respectively, when the pins $m$ and $n$ are inserted and the thills retained in the desired position. To enable the horse to travel on the left-hand side the thills are adjusted in the position indicated by the dotted lines A'' B'', being retained in such position by inserting the pins $m$ and $n$ in the holes $b$ and $e$, respectively; or it may be sufficient to accomplish the desired result in either of the two last cases that one of the thills only should be adjusted in each case, the thills being arranged in the position shown by A' B in the one case and in the position shown by A B'' in the other. By this arrangement, also, the thills may be adjusted nearer together or farther apart, so as to fit or adapt them to different horses.

Having described the construction and operation of my invention, I will specify what I claim therein and desire to secure by Letters Patent:

The combination of the thills A B and cross-bar C, pivoted together at $c$ $c$, with the arcs E F, perforated as described, and the removable pins $m$ $n$, arranged and operating substantially as and for the purposes herein shown and described.

WM. P. ROBINSON.

Witnesses:
A. F. ALDEN,
MARY ADAMS.